United States Patent
Turner et al.

(10) Patent No.: US 6,591,854 B1
(45) Date of Patent: Jul. 15, 2003

(54) SUPERCONDUCTIVE MAGNET BURST DISK ASSEMBLY

(75) Inventors: David R. Turner, Florence, SC (US); Daniel C. Woods, Florence, SC (US); Jerry Butler, Florence, SC (US); Daniel Molumby, Florence, SC (US); Lawrence V. Bischke, Florence, SC (US); Wayne Cooke, Florence, SC (US); Christopher G. King, Monroe, CT (US); Mehdi Kaveh, Westborough, MA (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 128 days.

(21) Appl. No.: 09/737,085

(22) Filed: Dec. 14, 2000

(51) Int. Cl.[7] ............................................... F16K 17/16
(52) U.S. Cl. ............................... 137/68.23; 137/68.28; 137/269; 220/89.2; 62/51.1
(58) Field of Search ........................... 137/68.19, 68.21, 137/68.22, 68.23, 68.24, 68.25, 68.26, 68.27, 68.28, 68.29, 68.3, 269; 220/89.2; 62/48.1, 51.1

(56) References Cited

U.S. PATENT DOCUMENTS

| | | | | |
|---|---|---|---|---|
| 4,635,451 A | * | 1/1987 | Laskaris | ..................... 62/51.1 |
| 4,759,460 A | * | 7/1988 | Mozley | ..................... 220/89.2 |
| 5,121,847 A | * | 6/1992 | Ellis | ........................... 220/89.2 |
| 5,570,803 A | * | 11/1996 | Farwell | ..................... 220/89.2 |
| 6,109,042 A | | 8/2000 | Woods et al. | |

FOREIGN PATENT DOCUMENTS

GB          1338747          * 11/1973

* cited by examiner

Primary Examiner—Michael Powell Buiz
Assistant Examiner—Ramesh Krishnamurthy
(74) Attorney, Agent, or Firm—Joseph S. Heino; Carl B. Horton

(57) ABSTRACT

A burst disk assembly has a burst disk which is interposed within the high pressure relief vent of a superconducting magnet. The burst disk is a composite design constructed of a solid carbon graphite center surrounded by an integrally formed stainless steel ring. A captured burst disk flange insures proper placement and seating of the burst disk during replacement and supports the burst disk so as to prevent it from falling or dropping out of the assembly during replacement of the ruptured burst disk. A deformable gasket contiguous to the burst disk seals the burst disk to the captured burst disk flange when the disk and the flange are pressed together. Attachment bolts are used to provide even application of pressure along the face of the burst disk and the captured burst disk flange.

18 Claims, 2 Drawing Sheets

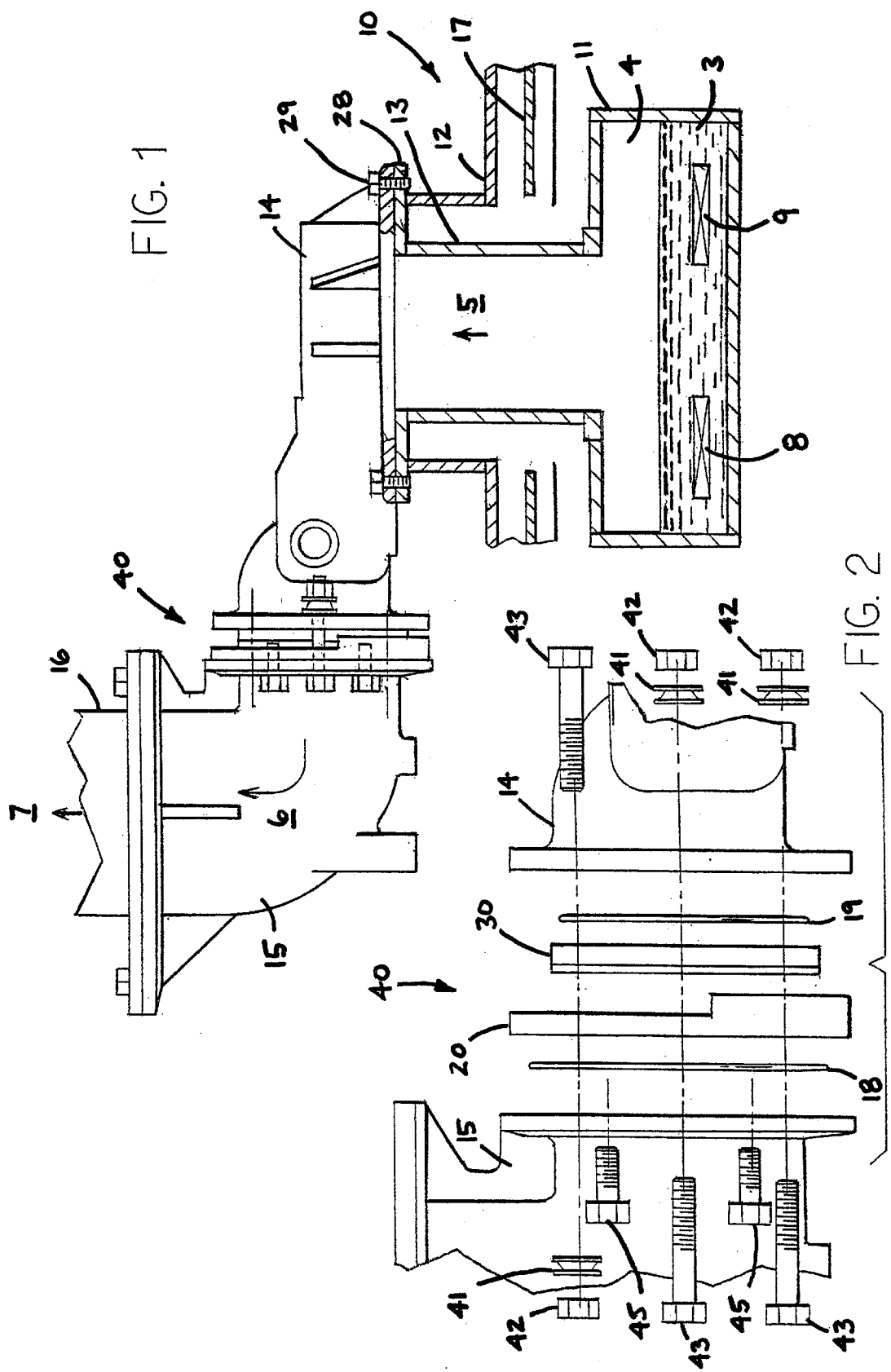

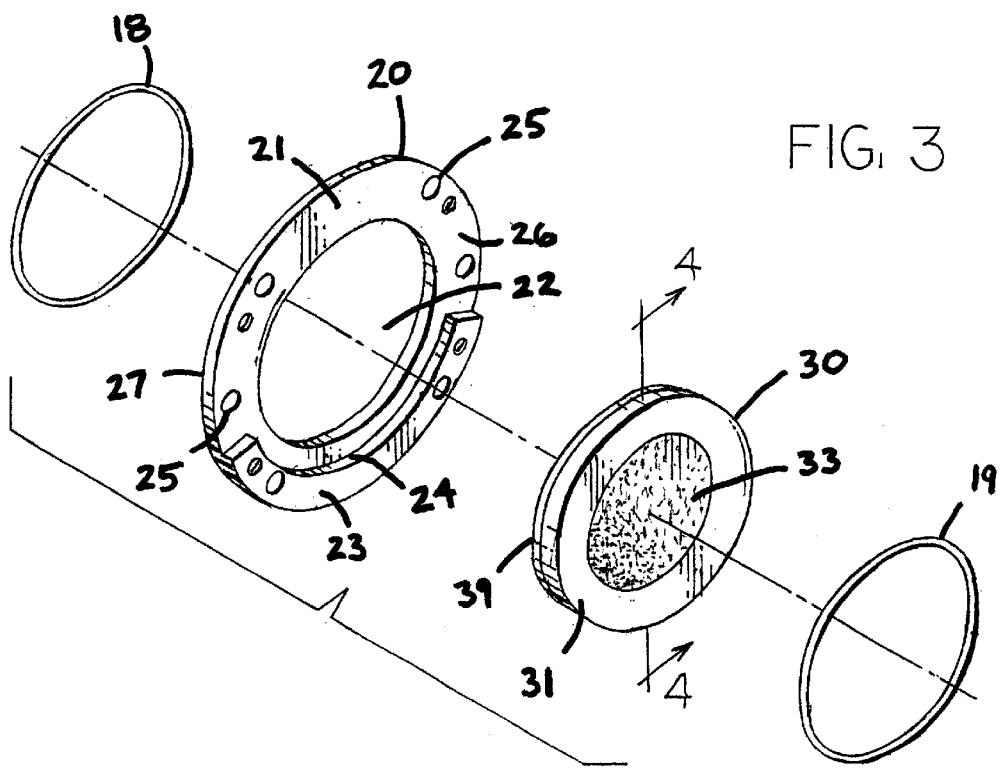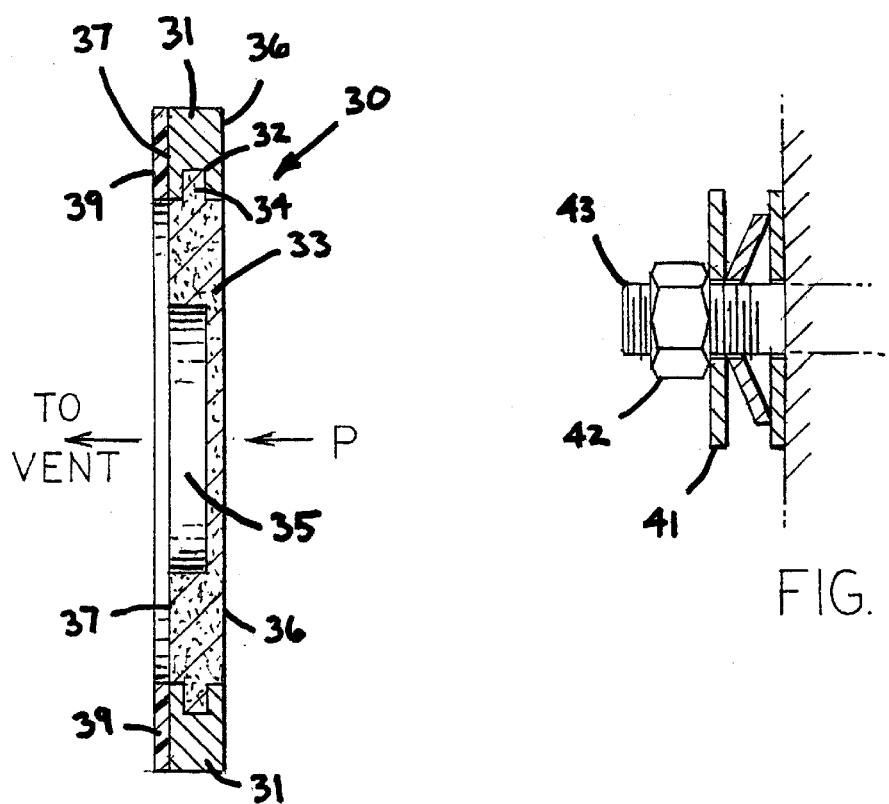

SUPERCONDUCTIVE MAGNET BURST DISK ASSEMBLY

BACKGROUND OF THE INVENTION

The present invention relates generally to superconducting magnets, and more particularly to an assembly for venting cryogenic gases away from a superconducting magnet when gas pressure builds to a potentially dangerous level due to magnet quench or reversion to a non-superconductive state.

It is well known that magnets can be made superconductive by enclosing them within a pressure vessel, or cryostat, which contains a reservoir of liquid helium or some other cryogenic liquid. The extreme cold reduces the resistance in the coils of the magnet such that when a power source is initially connected to the coil to introduce a current flow through the coils, the current will continue to flow through the coils due to the negligible resistance even after power is removed, thereby maintaining a magnetic field. Superconducting magnets find wide application, for example, in the field of magnetic resonance imaging (hereinafter "MRI").

During normal superconducting operation of the magnet, the cryostat must be a sealed or closed system so as to prevent leakage of helium gas from the cryostat and depletion of liquid helium from the reservoir. In the event of an undesired magnet quench or reversion of the magnet to a non-superconductive state, however, a rapid and potentially dangerous helium gas high pressure buildup in the cryostat requires pressure relief through rapid venting of the gas to the atmosphere outside the superconducting magnet. A replaceable burst disk may be interposed within a magnet vent assembly, which disk is designed to rupture at a predetermined pressure thereby opening the cryostat to an atmospheric vent. The atmospheric vent may be a vent stack which extends from the roof of a building or from the roof of a motor vehicle which is used to transport a portable MRI system contained within it.

Once ruptured, the burst disk must be replaced. Replacement of the burst disk and resealing of the vent assembly is necessary to prevent leakage of gaseous helium or other cryogen during normal superconducting operation of the magnet. The problem of gas leakage is most significant in superconducting magnets which recondense helium gas back to liquid helium. These are often referred to as zero boil-off magnets which are designed to minimize the difficulties encountered in shipping and storing the necessary reserve supply of liquid helium at cryogenic temperatures and the related problem of periodically transferring a portion of the liquid helium in the storage reservoir to the liquid helium supply in the MRI superconducting magnet. A helium gas leak within the venting assembly, including a leak at the level of the burst disk, will result in the need to continuously add or replenish the liquid helium thus defeating the goal and advantage of a zero boil-off magnet.

It has, however, proven difficult as a practical matter to properly seal the vent assembly, yet provide for ready replacement of the burst disk and resealing of the vent assembly following a high pressure rupture of the burst disk. The installation and removal of a pressure vessel burst disk has also proven to be a time consuming and labor intensive task. It has further been determined to be desirable to prevent the burst disk, which is constructed of a carbon graphite material, from being a structure carrying member of external forces due to the weight of other components which are typically used to construct the magnet vent assembly.

What is needed is a design for an improved burst disk assembly for a superconducting magnet which provides for ready and uncomplicated replacement of the burst disk after rupture, which preserves integrity of the vent sealing during normal operation of the magnet and which relieves the burst disk itself of any dynamic loading.

BRIEF SUMMARY OF THE INVENTION

A burst disk assembly is provided for use with a superconducting magnet system having a cryogenic gas vent. The gas vent is attached at one end to the cryogenic liquid reservoir of the magnet and is attached at the other end to an atmospheric exhaust vent. Cryogenic gas is vented away from the liquid reservoir to the atmosphere outside the magnet in the event of a rapid and potentially dangerous high pressure gas buildup. The burst disk assembly includes a composite design burst disk which is interposed within the vent to seal and effectively block the vent during normal operation of the superconducting magnet. The burst disk is selected to rupture, or burst, in the event of the buildup of cryogenic gas pressure which exceeds a predetermined amount. The burst disk is a composite design constructed of a solid carbon graphite center surrounded by an integrally formed stainless steel ring. A captured burst disk flange is provided which insures proper placement and seating of the burst disk during replacement and which supports the burst disk so as to prevent it from falling or dropping out of the assembly during replacement of a ruptured burst disk. A deformable gasket contiguous to the burst disk seals the burst disk to the captured burst disk flange when the disk and the flange are pressed together. Attachment bolts are used to provide for even application of pressure along the face of the burst disk and the captured burst disk flange. Hexagonal head bold heads are captured in slightly larger hexagonal patterns which are cast into the vent assembly components thereby allowing the technician who removes or installs the burst disk to tighten or loosen the attachment bolts using a single wrench. These features make the burst disk assembly more "user friendly" for a cartridge type installation. The captured burst disk flange also prevents the burst disk from being a structure carrying member of external forces due to the weight of other components of the vent assembly and relieves the burst disk of any dynamic loading.

BRIEF DESCRIPTION OF THE DRAWINGS

FIG. 1 is a simplified cross-sectional view of a superconducting magnet incorporating an embodiment of the burst disk assembly of this invention.

FIG. 2 is an enlarged and exploded side elevational view of the burst disk assembly shown in FIG. 1.

FIG. 3 is an exploded left side and front perspective view showing details of the components of the burst disk assembly.

FIG. 4 is a left side cross-sectional view of a burst disk taken along the lines 4—4 in FIG. 3.

FIG. 5 is a further enlarged and partially cross-sectional view of a fastener forming part of the securing means of the assembly.

DETAILED DESCRIPTION OF THE INVENTION

Referring now to the drawings, wherein like numerals represent like elements throughout, FIGS. 1 and 2 show an embodiment of the present invention. A recondensing superconducting magnet system 10 includes a helium pressure vessel 11, or cryostat, which is shown schematically in a reduced size for illustration purposes. The pressure vessel 11 encloses a plurality of magnet coils 8, 9. The magnet coils 8, 9 are, in normal superconducting operation of the system 10, immersed in liquid helium 3. Helium gas 4 forms above the liquid helium 3 by virtue of the boiling of the liquid helium 3 in providing cryogenic temperatures to the superconducting magnet system 10. The extreme cold maintains current flow through the magnet coils 8, 9 after a power source (not shown) initially connected to the coils 8, 9 is disconnected due to the absence of electrical resistance of the cold magnet coils 8, 9, thereby maintaining a strong magnetic field in the bore of the magnet. Helium gas 4 which forms may be recondensed back to liquid helium 3 by means of a mechanical refrigerator (not shown) or vented to the atmosphere through a small diameter vent (also not shown). The helium pressure vessel II is enclosed within a surrounding vacuum vessel 12 and includes intermediate members such as thermal radiation shield 17.

A cast plenum 14 is bolted to a collar 28 by bolts 29. The collar 28 is connected to the interior of the helium pressure vessel 11 by vent pipe 13. Plenum 14 connects to a burst disk assembly 40 having a burst disk 30 and a stainless steel captured burst disk flange 20. The burst disk 30 provides a barrier between plenum 14 and vent adapter 15 during normal operation of the superconducting magnet system 10. Vent adapter 15 is connected to vent pipe 16 which provides a direct pathway to the atmosphere 7.

Where quenching or reversion to a non-superconductive state of the magnet assembly 10 occurs, as much as 1,800 liters of liquid helium 3 can be boiled off in a period as short as 20 seconds. This boil off generates a large volume of helium gas 4 which must be quickly vented to the atmosphere 7 outside the building or mobile vehicle which houses the superconducting magnet system 10 in order to prevent damage to the magnet assembly 10. The rapid venting of helium gas 3 to atmosphere 7 through vent piping is made possible by the rupture of the burst disk 30 of the assembly 40 which is designed to rupture at a predetermined pressure above that produced during normal superconducting operation of the magnet assembly 10.

The burst disk 30 is constructed of a carbon graphite material having a thickness which will, for example, burst at a pressure of approximately 20 pounds per inch of helium gas pressure within the vent pipe 13 thereby allowing the helium gas 4 buildup to vent or flow downstream as indicated generally by arrows 5 and 6 to the outside atmosphere 7. As shown in FIGS. 3 and 4, the burst disk 30 has attached to its downstream face 37 a unitary flexible gasket 39 made of Garlock® material. The burst disk 30 includes a stainless steel outer ring 31 having an outer ring recess 32 defined within it. A central inner carbon disk 33 includes an outwardly extending inner disk flange 34 which is captured by the recess 32 of the stainless steel outer ring 31. The downstream side of the central disk 33 includes a recess 35 which facilitates rupture of the burst disk 30 when system gas pressure exceeds the predetermined level.

The burst disk 30 is captured and is supported by a stainless steel captured burst disk flange 20. The captured burst disk flange 20 includes an outer ring 21, a central aperture 22, and a shoulder 23. The shoulder 23 of the captured burst disk flange 20 is continuous about generally one third or 120° of the perimeter of the ring 21 and extends outwardly from the upstream face 26 of the flange 30 at the gravitational bottom of the flange 20 and the assembly 40. The shoulder 23 includes an arcuate flat 24 which supports a portion of the outer perimeter of the burst disk 30 as the disk 30 rests upon it. The width of the shoulder 23 is somewhat less than the thickness of the burst disk 30 and the diameter of the stainless steel ring 21 of the disk 30 is greater than the diameter of the flange aperture 22 which allows the gasket 39 of the burst disk 30 to be in sealing engagement with the flange 30 when pressure is applied.

The burst disk assembly 40 also includes a silicon Teflon® encapsulated O-ring 19 which is interposed between upstream face 36 of the burst disk 30 and the plenum 14. Similarly, a silicon Teflon® encapsulated O-ring is interposed between the downstream face 27 of the captured burst disk flange 20 and the vent adapter 15. The O-rings 18 and 19 provide resiliency by virtue of the silicon core and the Teflon® coating which protects the core against extreme cryogenic temperatures.

As best shown by FIG. 2, the burst disk 30, captured burst disk flange 20 and O-rings 18 and 19 are "sandwiched" between the plenum 14 and the vent adapter 15 and maintained under constant and equally displaced pressure by six circumferentially equally spaced bolts 43 which extend parallel to the central axis of the disk 20 and disk flange 30 and through flange apertures 25. The bolts 43 are secured at their remote ends by nuts 42 and belleville spring washers 41 which provide a constant pressure on the assembly. Additionally, the captured burst disk flange 20 is attached to the vent adapter 15 by means of four positioning bolts 45 which ensure proper orientation of the flange 23 relative to the overall assembly. Bolt heads are hexagonal in shape and are captured in slightly larger hexagonal pattern (not shown) cast in to the plenum 14 and/or the adapter 15.

In application, a ruptured burst disk 30 of the assembly 40 can be replaced by backing off the assembly bolts 43 and slightly separating the plenum 14 from the vent adapter 15. Complete removal of the two uppermost bolts 43 located opposite the flange shoulder 23 allows the ruptured burst disk 30 to be withdrawn from the assembly 40. A new burst disk 30 may be inserted from atop the captured burst disk flange 20 and urged downwardly to rest upon the flat 24 of the captured burst disk flange 20. In this fashion, the technician does not need to be concerned as to the proper alignment of the burst disk 30 because proper positioning of the burst disk 30 is accomplished by virtue of the captured burst disk flange 20. Replacement of the two uppermost bolts and tightening of all bolts 43 is effected.

The foregoing description of an embodiment of the invention has been presented for purposes of illustration. It is to be understood that variations in the details of construction, the arrangement and combination of parts, and the types of materials used may be made without departing from the spirit and scope of the invention as defined by the claims appended hereto.

| PARTS LIST | |
|---|---|
| 3 | liquid helium |
| 4 | helium gas |
| 5 | vent flow |
| 6 | vent flow |
| 7 | atmosphere |
| 8 | magnet coil |
| 9 | magnet coil |
| 10 | superconducting magnet system |
| 11 | helium pressure vessel or cryostat |
| 12 | vacuum vessel |
| 13 | vent pipe |
| 14 | plenum |

-continued

PARTS LIST

| | |
|---|---|
| 15 | vent adapter |
| 16 | vent pipe (fixed or mobile)-bellows |
| 17 | thermal radiation shield |
| 18 | O-ring between 5 and 20 |
| 19 | O-ring between 14 and 30 |
| 20 | captured burst disk flange |
| 21 | outer ring of 20 |
| 22 | central aperture of 20 |
| 23 | flange shoulder |
| 24 | arcuate flat of 23 |
| 25 | fastening apertures |
| 26 | upstream face of 20 |
| 27 | downstream face of 20 |
| 28 | vent collar |
| 29 | bolts |
| 30 | burst disk |
| 31 | outer ring of 30 |
| 32 | recess of 31 |
| 33 | inner carbon disk |
| 34 | flange of 33 |
| 35 | central recess |
| 36 | upstream face of 30 |
| 37 | downstream face of 30 |
| 39 | unitary flexible Garlok ® gasket |
| 40 | burst disk assembly |
| 41 | belleville spring washer |
| 42 | nut |
| 43 | bolt |
| 45 | flange capture bolts |

What is claimed is:

1. A burst disk assembly for use within a cryostat pressure relieving vent for a superconducting magnet, said vent being attached to the cryostat and connected to an exhaust vent in the enclosure in which the magnet is installed in order to vent cryogenic gas away from the cryostat to the atmosphere outside the magnet in the event of an undesired pressure buildup, comprising:
   a) a burst disk interposed in and blocking said vent during normal operation of said superconducting magnet, said burst disk selected to burst in the event of a cryogenic gas pressure in said cryostat which exceeds a predetermined pressure in order to open a path between said cryostat and said atmosphere;
   b) a burst disk capture flange interposed in said vent adjacent said burst disk, said burst disk capture flange forming an annular ring having a central aperture defined within it and having a disk-bearing shoulder forming an arcuate flat having an inner diameter slightly lager than the outer diameter of the burst disk formed about a portion of its periphery; and
   c) securing means for said burst disk assembly extending substantially parallel to the axis of said vent to apply constant pressure to said assembly to press said burst disk and said burst disk capture flange toward each other.

2. The burst disk assembly of claim 1 wherein the flat of said capture flange is situated at the gravitational bottom of said assembly.

3. The burst disk assembly of claim 2 wherein said burst disk is comprised of a unitary design having a carbon graphite center portion which is surrounded by an annular stainless steel outer portion.

4. The burst disk assembly of claim 3 wherein said burst disk has at least one face and includes a contiguous deformable gasket attached to said face to seal the region between said burst disk and said capture flange.

5. The burst disk assembly of claim 4 wherein said securing means are circumferentially substantially equally spaced about said burst disk and said capture flange.

6. The burst disk assembly of claim 5 wherein said securing means further includes a plurality of bolt and nut assemblies with spring washers to maintain pressure on said burst disk and said capture flange.

7. The burst disk assembly of claim 6 wherein said securing means further includes a plurality of bolts to secure said capture flange within said vent.

8. The burst disk assembly of claim 7 wherein said spring washers are conical washers.

9. A burst disk assembly for use within a cryostat pressure relieving vent of a superconducting magnet system, said vent having a first end connected to a cryostat plenum and having a second end connected to an exhaust vent adapter for venting cryogenic gas away from the cryostat to the atmosphere outside the magnet in the event of an undesired pressure buildup, comprising:
   a) a burst disk interposed in and blocking said vent during normal operation of said superconducting magnet, said burst disk selected to burst in the event of a cryogenic gas pressure in said cryostat which exceeds a predetermined pressure in order to open a path between said cryostat and said atmosphere;
   b) a burst disk capture flange interposed in said vent adjacent said burst disk, said burst disk capture flange forming an annular ring having a central aperture defined within it and having a disk-bearing shoulder wherein said disk bearing shoulder includes an arcuate flat supporting the burst disk formed about a portion of its periphery; and
   c) securing means for said burst disk assembly extending substantially parallel to the axis of said vent to apply constant pressure to said assembly to press said burst disk and said burst disk capture flange toward each other.

10. The burst disk assembly of claim 9 wherein the flat of said capture flange is situated at the gravitational bottom of said assembly.

11. The burst disk assembly of claim 10 also including an O-ring to seal the region between the burst disk and the plenum.

12. The burst disk assembly of claim 11 also including an O-ring to seal the region between the burst disk flange and the vent adapter.

13. The burst disk assembly of claim 12 wherein said burst disk is comprised of a unitary design having a carbon graphite center portion which is surrounded by an annular stainless steel outer portion.

14. The burst disk assembly of claim 13 wherein said burst disk has a face and includes a contiguous deformable gasket attached to said face to seal the region between said burst disk and said capture flange.

15. The burst disk assembly of claim 14 wherein said securing means are circumferentially substantially equally spaced about said burst disk and said capture flange.

16. The burst disk assembly of claim 15 wherein said securing means further includes a plurality of bolt and nut assemblies with spring washers to maintain pressure on said burst disk and said capture flange.

17. The burst disk assembly of claim 16 wherein said securing means further includes a plurality of bolts to secure said capture flange within said vent.

18. The burst disk assembly of claim 17 wherein said spring washers are conical washers.

* * * * *